United States Patent [19]

Jacobson

[11] Patent Number: 4,488,611
[45] Date of Patent: Dec. 18, 1984

[54] LOAD CELL
[75] Inventor: Walter E. Jacobson, Meriden, Conn.
[73] Assignee: Revere Corporation of America, Wallingford, Conn.
[21] Appl. No.: 410,703
[22] Filed: Aug. 23, 1982
[51] Int. Cl.³ .......................... G01G 3/14; G01G 3/08; G01L 5/12
[52] U.S. Cl. .................... 177/211; 177/229; 73/862.65
[58] Field of Search .............. 177/211, 229; 73/862.65

[56] References Cited

U.S. PATENT DOCUMENTS

| | | |
|---|---|---|
| 2,597,751 | 5/1952 | Ruge . |
| 2,866,059 | 12/1958 | Laimins . |
| 3,180,139 | 4/1965 | Soderholm . |
| 3,222,628 | 12/1965 | Pien . |
| 3,376,537 | 4/1968 | Pugnaire . |
| 3,554,026 | 1/1971 | Seed . |
| 3,559,467 | 2/1971 | Gurol et al. ............... 73/862.65 |
| 3,577,779 | 5/1971 | Laimins . |
| 3,602,866 | 8/1971 | Saxl ...................... 177/211 X |
| 4,065,962 | 1/1978 | Shoberg . |

Primary Examiner—George H. Miller, Jr.

[57] ABSTRACT

A load cell of the cantilever beam type with a large cylindrical hole extending horizontally through the beam and recesses around the hole to provide a thin tubular surface on which strain gauges are attached.

11 Claims, 6 Drawing Figures

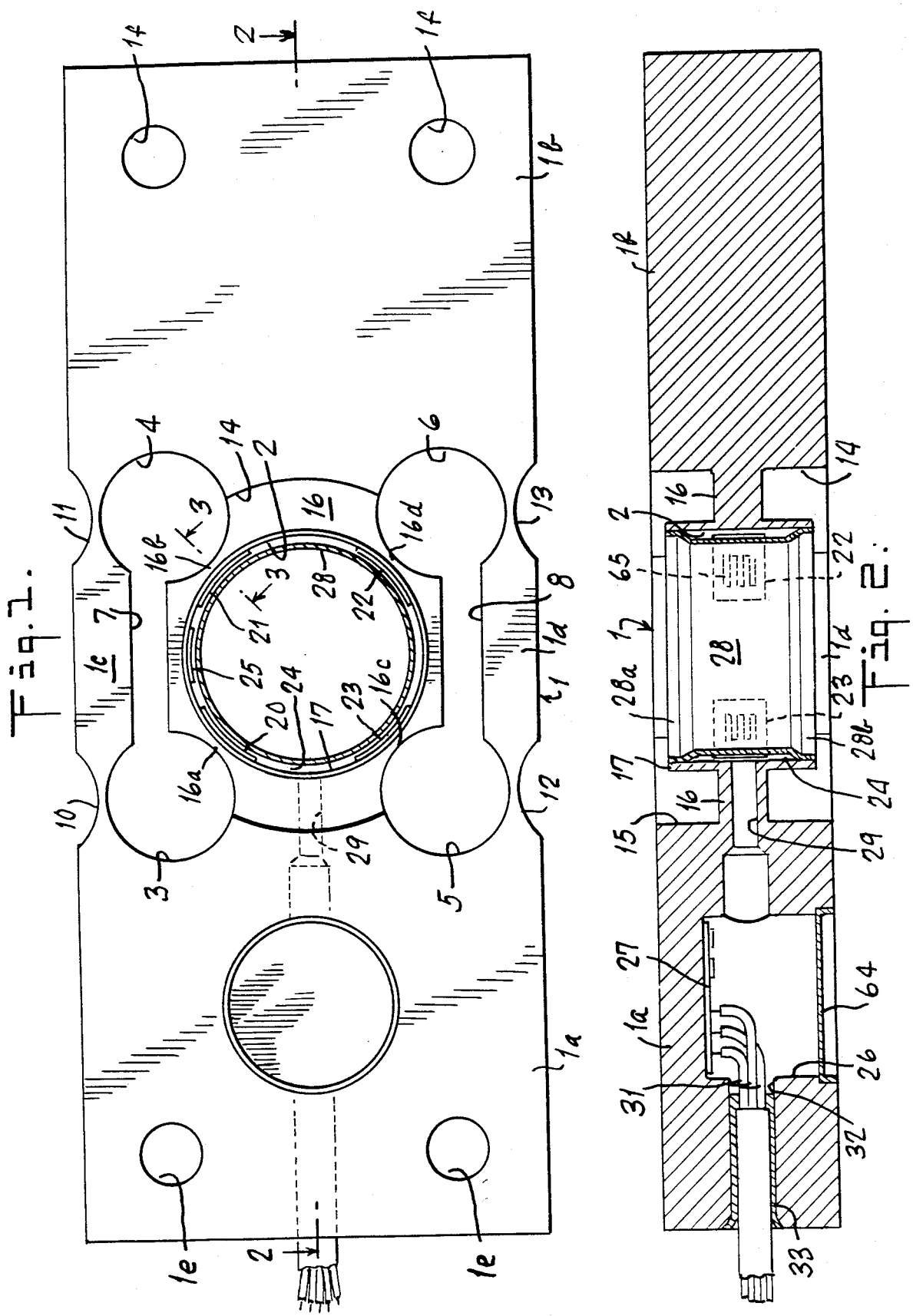

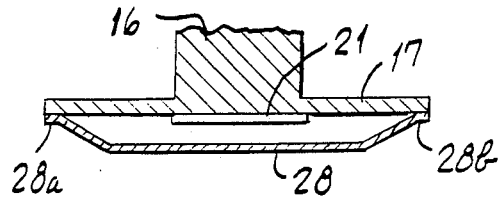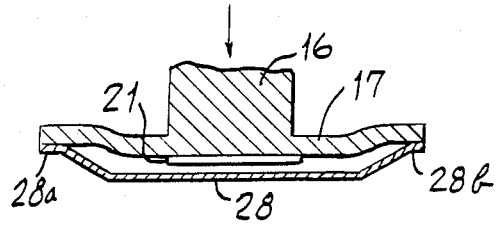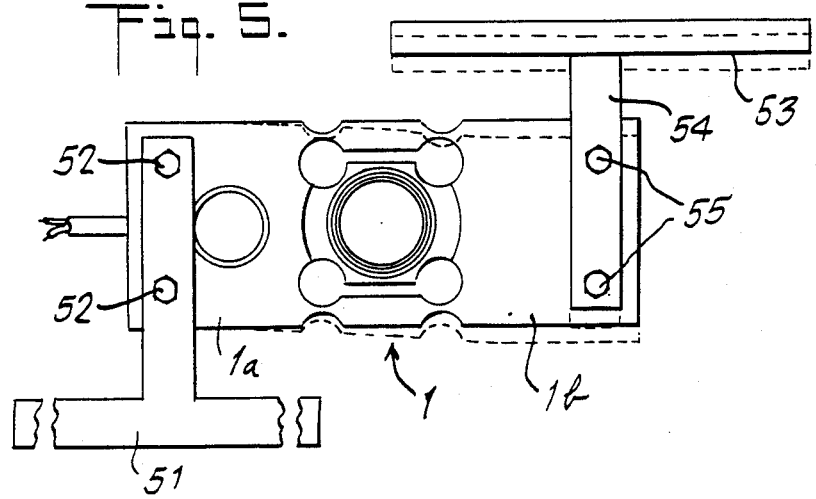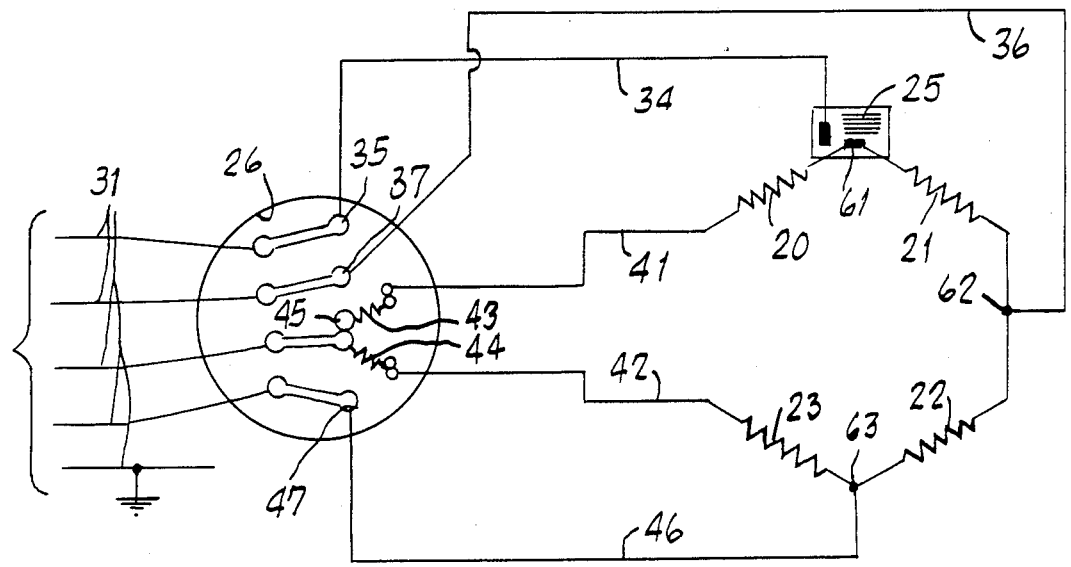

LOAD CELL

BRIEF SUMMARY

The present invention relates to a load cell of the cantilever beam type, which is loaded at one end and supported at the opposite end, so that the middle part of the beam is stressed by the load. The middle part of this load cell has a relatively large cylindrical hole extending horizontally through the beam from side to side. Four smaller cylindrical holes extend through the beam parallel to the large hole. These four smaller holes have axes located in planes making angles of about 45° with respect to the vertical and horizontal planes through the axis of the large hole. Two horizontally extending slots connect the upper and lower pairs of smaller holes. Each pair of smaller holes and their connecting slots are separated from the adjacent outer surface of the beam by a bridging portion of the beam. The opposite sides of the beam have aligned annular recesses concentric with the large hole and intersecting all the smaller holes. The bottoms of the recesses define a web which is preferably aligned with the vertical central plane of the beam. The inner sides of the recesses and the large hole define a cylinder.

There are thus four force transmitting means extending between the ends of the beam. Two of these force transmitting means are the bridging portions mentioned above. The other two are portions of the web connecting the ends of the beam and adjacent but spaced from the periphery of the relatively large hole. The bridging portions extend the full width of the beam and resist eccentric loads. The web portions are near the center line of the beam and are stressed by vertical loads. Strain gages are applied to the internal surface of the cylinder and are located within a hermetically sealed chamber enclosed by a seal ring received in the cylinder. Electrical connections to the strain gage elements extend through a passage in the web to a second chamber in the supported end of the beam, where they are fixed to terminals. External electrical connections extend from outside of the beam through another passage into the second chamber which is also hermetically sealed.

DRAWINGS

FIG. 1 is an elevational view of a load cell beam constructed in accordance with the invention.

FIG. 2 is a horizontal sectional view taken on the line 2—2 of FIG. 1.

FIG. 3 is a fragmentary sectional view taken on the line 3—3 of FIG. 1, with the load cell beam unloaded.

FIG. 4 is a view similar to FIG. 3, illustrating, with some exaggeration, a deformation of the beam under load.

FIG. 5 illustrates a weighing scale incorporating a beam constructed in accordance with the invention.

FIG. 6 is a wiring diagram showing the electrical connections in a load cell constructed in accordance with the invention.

FIGS. 1-4

A load cell in accordance with the invention is generally indicated at 1 and includes a supported end 1a, and a load carrying end 1b. The beam may be mounted to receive a load acting in any direction. For convenience in illustration, the load force and the supporting force are described herein as vertical and directions at right angles to those forces are described as horizontal. The beam is constructed from one single integral piece of metal, preferably steel.

Through the middle of the beam there is bored a relatively large horizontal cylindrical hole 2 and four smaller, generally cylindrical holes 3,4,5,6, all parallel to the large hole 2, as shown, and spaced radially from that large hole. The upper holes 3 and 4, as viewed in FIG. 1, are connected by a slot 7 and the lower holes 5 and 6 are connected by a slot 8. The holes 3,4,5,6 and the slots 7,8 define bridging portions 1c, 1d of the beam, which extend between the load carrying end 1b and the supported end 1a. In the upper surface of the beam 1 there are provided arcuate recesses 10 and 11 having their centers aligned with the centers of holes 3 and 4. In the bottom surface of the beam there are similarly provided arcuate recesses 12 and 13 having their centers aligned respectively with the centers of holes 5 and 6. If the overall height of the beam is reduced, the recesses 10,11,12 and 13 may be omitted.

An annular recess 14, preferably concentric with the middle hole 2, is cut in the front face of the beam as viewed in FIG. 1. Another annular recess 15 of similar dimension to the recess 14 and preferably concentric with the hole 2 is cut in the rear face of the beam. The bottoms of the recesses 14 and 15 define between them a web 16 extending between the ends 1a and 1b and around the periphery of a cylinder 17 defined by the hole 2 and the recesses 14 and 15. The web 16 is intersected by the four smaller holes 3,4,5,6, which define four narrow necks 16a, 16b, 16c, 16d of the web adjacent the periphery of the cylinder 17.

There are thus four force transmitting means extending between the load carrying end 1b of the beam 1 and the supported end 1a. Two of the force transmitting means are the bridging portions 1c and 1d, which preferably extend the full width of the beam, as shown, and resist any twisting moments due to eccentric loading on the end 1b. The other two force transmitting means are the two middle portions of the web 16, the upper one including the narrow necks 16a and 16b, and the lower one including the narrow necks 16c and 16d. The web 16 has a width which is small as compared to the full width of the beam, as may best be seen in FIG. 2. The latter two force transmitting means are located near the center line of the beam and do not resist moments due to eccentric loading, but only resist vertical forces acting on the load carrying end 1b.

Four strain gages 20,21,22 and 23 are fixed to the inner surface of the cylinder 17. A temperature compensating resistance 25 is also fixed to the inside surface of the cylinder 17. A ring 28 is inserted in the cylinder 17 and has flanges 28a and 28b at its ends which are attached as by welding to the inner surface of the cylinder 17 adjacent its ends. The ring 28 and the cylinder 17 define a chamber 24 in which all the strain gage elements and the temperature compensating element are sealed and thereby protected from the surrounding atmosphere.

The strain gages 20,21,22 and 23 are located adjacent the narrow neck portions of the web 16, which are the portions most highly stressed by vertical loads.

The strain gages 20,21,22 and 23 are preferably of the electrical resistance type and are connected in a bridge circuit illustrated in FIG. 6, having terminals 61,62,63 and 45. Terminals 61,62 and 63 are respectively connected to conductors 34,36 and 46 extending through a passage 29 into a chamber 26 formed in one side of the supporting end 1a of the beam. There the conductors are fastened to a terminal board 27 (FIG. 2) which also provides a support for the ends of conductors 31 extending to external circuits through a passage 32 sealed by an insulating grommet 33. In FIG. 6, it may be seen that the terminal 61 is connected through temperature compensating resistance 25 and the conductor 34 to a terminal 35 in the recess 26. The common terminal 62 of strain gages 21 and 22 are connected through conductor 36 to another terminal 37 in the recess 26. The common terminal 63 of strain gages 22 and 23 is connected through conductor 46 to a terminal 47 in recess 26. The arms of the bridge which include strain gages 20 and 23 extend through conductors 41 and 42, respectively, and balance and temperature compensating resistors 43 and 44, respectively, to a common terminal 45 in the chamber 26. Appropriate external connections 31, mentioned above, are provided for the four terminals 35,37,45 and 47. The chamber 26 is hermetically sealed by a cover 64 welded to its wall adjacent its outside end.

The cylinder 17 is preferably made shorter than the width of the beam, as shown in FIG. 2, to protect its thin walls from contact with external objects.

FIG. 5

This figure illustrates the load beam constructed in accordance with FIGS. 1-4 used as part of a weighing scale. A pedestal 51, adapted to rest on any convenient support, includes an upright column connected by bolts 52 to the supporting end 1a of the beam 1, the bolts passing through bolt holes 1e (FIG. 1). The load end 1b of the beam 1 in FIG. 5 carries a scale pan 53 supported on the column 54 attached by bolts 55 passing through holes 1f in the beam 1b. The dotted line position of the beam 1 illustrates, with some exaggeration, its deflection under load.

OPERATION

When the beam 1 is unloaded, the cylinder 17 has a true cylindrical configuration as shown in FIG. 3. When loaded, the web 16 is stressed. For example, the web 16 adjacent the strain gage 21 is deflected inwardly toward the center of the large hole. The seal ring 28 is somewhat stiffer than the thin walled cylinder 17, so that the cylinder 17 adopts the configuration shown in a somewhat exaggerated fashion in FIG. 4. The cylinder 17 flexes between its ends and the web 16 so that the stiffness introduced by seal ring 28 does not substantially affect the deformation of the web 16 under load.

When the beam is stressed by an eccentric load, e.g., by an off-center load on the scale pan 53, any twisting moment due to the eccentricity of the load is resisted primarily by the bridging portions 1c and 1d of the beam, and not by the middle force transmitting means including the narrow necks 16a,16b,16c,16d. Thus, the load measured by the strain gages 20,21,22,23 is only the load due to the weight on the scale pan and is not affected by the eccentricity of placement of the load on the scale pan.

The capacity of a load cell constructed in accordance with the invention is determined by the capacity of the web 16 to resist vertical forces. That capacity, for any given material, is determined by the thickness of the web.

The strain gages are applied to the inside surface of the cylinder 17. As shown at 65 in FIG. 2, each strain gage consists of an array of electrical resistance elements having their long dimensions extending circumferentially of the cylinder 17. The resistance elements are distributed axially of the cylinder opposite the web 16 and over substantially the whole width (vertical dimension as seen in FIG. 2) of the strained area of cylinder 17, which corresponds to the thickness of web 16. Hence, there is provided a greater strained surface for receiving a strain gage element, for any given capacity of load cell, than in the load cells of the prior art.

I claim:
1. A load cell, comprising:
   a. an elongated beam (1) adapted to be supported at one end (1a) and adapted to support a load at its opposite end (1b);
   b. said beam having:
      1. a relatively large cylindrical hole (2) extending horizontally through the beam from side to side at a locality between said ends;
      2. four smaller cylindrical holes (3,4,5,6) extending through the beam and spaced radially from the large hole;
      3. two slots (7,8) extending horizontally through the beam and respectively connecting upper and lower pairs of said smaller holes, said pairs of smaller holes and their connecting slots being separated from the outer surfaces of the beam by bridging portions (1c,1d) of the beam; and
      4. at least one annular recess (14 or 15) in a side face of the beam, said recess being concentric with the large hole and intersecting all the smaller holes;
   c. said large hole, said smaller holes, said slots and said recess cooperating to define a cylinder (17) connected to the ends of the beam by a web (16) at the bottom of said recess, said bridging portions, said cylinder and said web cooperating to define four force transmitting means extending between the ends of the beam; and
   d. at least one strain gage (20,21,22,23) attached to an inner wall of the cylinder.

2. A load cell as in claim 1, including a seal ring (28) concentric with and within said cylinder, said ring having at its ends flanges (28a,28b) hermetically sealed to the cylinder, so that said strain gage is located in a hermetically sealed chamber (24) defined by the cylinder and the ring.

3. A load cell as in claim 1, in which said bridging portions (1c,1d) have recesses (10,11,12,13) in the top and bottom surfaces of the beam opposite the four smaller holes, to provide narrow neck sections in said bridging portions.

4. A load cell as in claim 1, in which said cylinder is axially shorter than the thickness of the beam, so that the walls of the cylinder are protected by the beam against impacts with external objects.

5. A load cell as in claim 1, in which said four smaller holes have axes located in planes making angles of about 45° with respect to the vertical and horizontal planes through the axis of the large hole, and including four strain gages (20,21,22,23) attached to the inner wall of the cylinder, each of said strain gages being located so as to intersect one of said 45° planes.

6. A load cell as in claim 1, in which:
   a. said bridging portions extend laterally of the beam for substantially its full width and resist moments due to loads acting on the beam eccentrically with respect to its center line; and b. said web is located adjacent the center line of the beam and has a horizontal dimension perpendicular to that center line which is small as compared to the full width of the beam, so that the web resists substantially only forces acting vertically.

7. A load cell as in claim 1, including:
   a. a chamber (26) extending into the beam from one side surface of said one end of the beam;
   b. a first passage (29) extending from the inside of the cylinder through one of the webs into said chamber;
   c. a second passage (32) extending from the chamber to an end surface of said one end of the beam;
   d. first electrical conductor means (34,36,41,42,46) extending from said strain gage through said first passage and completely filling the passage;
   e. terminals (35,37,45,47) in said chamber to which said electrical conductor means are connected;
   f. second electrical conductor means (31) extending from said terminals through said second passage and completely filling said second passage;
   g. cover means (64) hermetically sealed to said beam and cooperating with the beam to enclose the chamber; and
   h. a seal ring (28) concentric with and within said cylinder, said ring having at its ends flanges (28b) hermetically sealed to the cylinder, so that said strain gage is located in a second hermetically sealed chamber.

8. A load cell as in claim 1, including two aligned annular recesses (14,15) in opposite side faces of the beam, said recesses intersecting all the smaller holes; said recesses being of equal depth so that the web at the bottom of the recesses is centered on the vertical central plane of the beam.

9. A load cell as in claim 8, in which the cylinder (17) defined by said recesses and said hole has walls substantially thinner than said web.

10. A load cell as in claim 8, in which said strain gage comprises an array of elongated parallel electrical resistance elements having their long dimensions extending circumferentially of the cylinder wall, said array of elements being distributed axially of the cylinder opposite the web and substantially throughout the thickness of the web.

11. A load cell, comprising:
   a. an elongated beam (1) adapted to be supported at one ene (1a) and adapted to support a load at its opposite end (1b);
   b. said beam including:
      1. an integral web connecting said one end and said opposite end, said web having a substantial longitudinal extent between said ends, and having a horizontal lateral dimension small as compared to the corresponding dimension of the beam ends;
      2. a cylindrical hole extending through the web from side to side;
      3. a cylinder integral with the web and extending in opposite directions therefrom parallel to the axis of said hole; and
      4. a strain gage attached to the inner wall of the cylinder, said strain gage comprising an array of elongated parallel electrical resistance elements having their long dimensions extending circumferentially of the cylinder wall, said array of elements being distributed axially of the cylinder opposite the web and substantially throughout the thickness of the web.

* * * * *